US007113686B2

(12) United States Patent
Bellekens et al.

(10) Patent No.: US 7,113,686 B2
(45) Date of Patent: Sep. 26, 2006

(54) OPTICAL CIRCUIT ENCLOSURE

(75) Inventors: Kathleen Bellekens, Winksele-Delle (BE); Joris Franckx, Bonheiden (BE)

(73) Assignee: Tyco Electronics Raychem NV, (BE)

( * ) Notice: Subject to any disclaimer, the term of this patent is extended or adjusted under 35 U.S.C. 154(b) by 39 days.

(21) Appl. No.: 10/510,271

(22) PCT Filed: Apr. 3, 2003

(86) PCT No.: PCT/GB03/01458

§ 371 (c)(1),
(2), (4) Date: Oct. 5, 2004

(87) PCT Pub. No.: WO03/087912

PCT Pub. Date: Oct. 23, 2003

(65) Prior Publication Data

US 2005/0123261 A1 Jun. 9, 2005

(30) Foreign Application Priority Data

Apr. 12, 2002 (GB) ................................ 0208568.6
May 1, 2002 (GB) ................................ 0209974.5
Aug. 16, 2002 (GB) ................................ 0219102.1

(51) Int. Cl.
*G02B 6/00* (2006.01)

(52) U.S. Cl. ....................... 385/135; 385/134; 385/147

(58) Field of Classification Search ................ 385/134, 385/135, 147
See application file for complete search history.

(56) References Cited

U.S. PATENT DOCUMENTS 4,428,645 A 1/1984 Korbelak et al. .......... 350/96.2
4,679,896 A 7/1987 Krafeik et al. ............. 350/96.2
4,932,744 A * 6/1990 Messelhi ..................... 385/99
5,323,478 A 6/1994 Milanowski et al. ....... 385/135
5,420,956 A 5/1995 Grugel et al. .............. 385/135
5,481,639 A 1/1996 Cobb et al. ................. 385/135
5,631,993 A 5/1997 Cloud et al. ................ 385/135
5,647,045 A 7/1997 Robinson et al. ........... 385/135
6,249,632 B1 * 6/2001 Wittmeier et al. .......... 385/135
6,249,633 B1 * 6/2001 Wittmeier et al. .......... 385/135

FOREIGN PATENT DOCUMENTS

EP 0 795 768 9/1997
EP 0 903 594 3/1999
JP 2000-121840 4/2000
JP 2001-42156 2/2001
WO 92/22842 12/1992

OTHER PUBLICATIONS

International Search Report for PCT/GB 03/01458.
International Preliminary Examination Report for PCT/GB03/01458.
GB Search Report for 0209974.5 dated Oct. 3, 2002.
GB Search Report for 0209974.5 dated Jan. 7, 2003.

* cited by examiner

*Primary Examiner*—Sung Pak
*Assistant Examiner*—James D. Stein
(74) *Attorney, Agent, or Firm*—Myers Bigel Sibley & Sajovec

(57) ABSTRACT

In one aspect the invention provides an optical circuit enclosure enclosing at least one optical circuit or optical circuit component; the enclosure comprises: a tray type container containing at least one optical circuit or optical circuit component; a tray type closure member closing the container; the closure member containing at least one further optical circuit component on an external side thereof for optically connecting the enclosed component to an external optical circuit; and sealing means providing a moisture resistant seal between the container and the closure member.

13 Claims, 9 Drawing Sheets

OPTICAL CIRCUIT ENCLOSURE

RELATED APPLICATIONS

The present application is a National Phase application of PCT/GB03/001458 filed on Apr. 3, 2003 and published in English, which claims priority from Applications GB 0208568.6 filed on Apr. 12, 2002, GB 0209974.5 filed on May 1, 2002 and GB 0219102.1 filed on Aug. 16, 2002, the disclosures of which are hereby incorporated by reference.

FIELD OF INVENTION

This invention concerns an optical circuit enclosure and in particular an enclosure for pre-fabricated pre-installed optical circuits or optical circuit components.

BACKGROUND OF THE INVENTION

Fibre optic circuits may contain splitters, filters, attenuators and other passive or active optical components, each of which is normally provided with optical fibres for connecting these components to other components. Optical components can be connected by splicing the ends of the fibre protruding from the components to be joined. For permanent connections it is normally preferred to splice the fibres using a suitable splicing device, however, it is also possible to connect fibres using suitable connectors. In order to facilitate the connection of optical components to a fibre optic network such as a telecommunications network it is usually convenient to mount the optical components to be connected within a so-called “organiser tray” which comprises a tray like structure having various component holders, splice holders and/or optic fibre storage regions located within a thermoplastic closure. This arrangement facilitates field installation of optical components since a high degree of component and fibre organisation can be achieved with the organiser tray.

Closures having an organiser tray with a storage compartment on the underside of the tray are known. However, known closure and organiser tray arrangements have a number of drawbacks particularly where it is desirable to install expensive and/or delicate optical components since great care must be taken not to damage such components when access to the organiser tray is required for field installations of the optical components within the closure. The optical components may be damaged during manipulation of the organiser tray and additionally or alternatively by water or moisture ingress or by other environmental effects.

There is a requirement therefore for an optical circuit enclosure for both sensitive (and/or expensive) and less sensitive (and/or expensive) optical components that can be readily installed in an optical circuit or network under field conditions with the minimum risk of damage to the more delicate or environmentally sensitive optical components to be installed.

There is also a requirement for an enclosure where pre-fabricated factory installed optical components are protected from environmental and installation damage when the optical components are being connected to other optical components in the field.

There is a further requirement for an optical circuit enclosure where factory installed optical components and/or circuits are protected in a container having a tamper evident seal.

SUMMARY OF THE INVENTION

According to aspects of the invention there is an optical circuit enclosure enclosing at least one optical circuit or optical circuit component; the said enclosure comprising:

an open box or tray-type container containing the said circuit(s) or component(s), a tray-type closure member arranged with its external base surface covering (preferably closing) the said container, the closure member carrying on the opposite side thereof from the container at least one further optical circuit component for connecting the said enclosed circuit(s) or component(s) to an external circuit or component, and sealing means providing a moisture-resistant seal between the said container and the said closure member.

The above aspects of the invention readily enable delicate and/or expensive optical circuits or components thereof to be enclosed within the container and protected from environmental damage and/or damage due to handling, storage, transport and installation. The sealing means readily prevents liquid or vapour ingress to the enclosed container to protect the component or components therein. The further optical components on the side of the tray type closure member opposite from the side of the container readily permit the enclosed component or components to be optically connected to an external optical circuit or network. In this way it is possible to connect the enclosed component or components without physically accessing the component within the enclosed container.

Preferably, the said sealing means comprises a laminar sheet intermediate the said container and the said closure member. In such an embodiment the laminar sheet can enclose the container in such a way that the closure member protects the laminar sheet as well as the optical component or components contained within the container. In this way a relatively thin sheet can be interposed between the container and closure member so that a moisture resistant seal is formed independently of the closure member material. In other embodiments the sealing means may be further provided by the interengaging surfaces of the container and closure member when formed of suitable material, for example aluminium or other metals.

In preferred embodiments, the said laminar sheet comprises a metallised moisture resistant layer. Preferably, the metallised layer comprise an aluminium laminate.

Preferably, the said sealing means provides a moisture resistant seal between the said container, the said closure member and fibre optic connecting cables exiting the enclosed region of the container from the enclosed component. This readily enables optic fibre or fibres to pass through the seal into the enclosed region of the container without affecting the performance of the seal. This is an important consideration since the optic fibres are necessary for connecting the enclosed component or components to external circuits.

In one preferred embodiment, the said sealing means comprises a pair of sealing members and the said optical fibres are located between the said strips and sealed to the strips by the application of heat and/or pressure. By accommodating the optic fibres between the sealing strips heat and/or pressure or both can be readily applied causing the sealing strips to change shape and surround the fibres. This is particularly advantageous when the sealing strips are made of plastic which may melt slightly, resulting in a good mutual bond and a good bonding with the fibres.

Preferably, the said closure member is attachably/detachably mounted with respect to the said container. This readily enables the closure member to be removed to provide access to the interior region of the container so that the optical components contained therein may be removed replaced or repaired or for the installation of a further component or components.

In preferred embodiments, the said enclosed circuit or component is a pre-installed and/or pre-fabricated circuit or component installed in the said container during manufacturing assembly thereof This is particularly advantageous where it is required to seal pre-fabricated components or circuits within the container during manufacturing assembly so that installation of the prefabricated circuit or components comprising the circuit can be automated.

In preferred embodiments, the closure member closes each of the said containers, thereby to provide separate enclosures for respective optical circuits and/or components. One or more fibre splices may be mounted in a splice holder mounted on the external base surface of the closure on the opposite side thereof from the container for connecting these components or the enclosed component or components to an external circuit or network. The external base surface of the closure member may further contain spare lengths of fibre for field installation etc. Components such as couplers and splitters are generally quite robust and therefore may be readily mounted on the external base surface of the closure member without significant risk of damage during installation to an external network or circuit.

In preferred embodiments, the enclosure further comprises at least one further container and the said closure member closes each of the said containers, thereby to provide separate enclosures for respective optical circuits and/or components. This readily enables a single closure member to be used in combination with a plurality of containers so that a plurality of enclosures are formed on the side of the closure member opposite that of the external base surface of the closure member containing the further components. This is particularly advantageous in embodiments where two or more expensive or sensitive optical components or circuits are required to be separated from each other and the further component(s) on the opposite side of the closure member.

According to a further aspect of the invention there is an optical circuit enclosure enclosing at least one pre-fabricated and pre-installed optical circuit or optical circuit component, the said enclosure comprising:

an open box or tray-type container containing the said circuit(s) or component(s), a tray-type closure member arranged with its external base surface covering (preferably closing) the said container, the closure member carrying on the opposite side thereof from the container at least one further optical circuit component for connecting the said enclosed circuit(s) or component(s) to an external circuit or component.

In this aspect of the invention the container is specifically designed for factory installation of pre-fabricated optical circuit(s) and/or component(s) during manufacturing assembly. The closure member protects the circuit(s) and/or component(s) located in the container and further provides an organiser type tray for storing other components on the external base surface covering the container, including for example spare lengths of fibre and fibre splices for connecting the components to an external network or circuit. This arrangement is particularly advantageous for field installation since sensitive and/or expensive pre-fabricated factory installed components and circuits can be located securely within the enclosed container while other less sensitive components can be conveniently positioned on the external side of the closure member for field installation.

According to another aspect of the invention there is an optical circuit enclosure enclosing at least one optical circuit or optical circuit component together with lengths of optical fibre which extend outwards of the enclosure for optically connecting the said enclosed circuit(s) or component(s) to an external circuit or component, the said enclosure comprising:

a tray-type container containing the said enclosed circuit(s) or component(s), and a tamper-evident closure member sealing the said container around the said enclosed circuit(s) or component(s) and the enclosed lengths of optical fibre.

This aspect of the invention shares all the advantages mentioned above in relation to the second aspect while providing further advantages in relation to installing optical circuits and components in the container during manufacturing assembly with a tamper evident closure. In this way it is possible to seal the component(s) and/or circuit(s) in the container in such a way that removal of the closure member will not be possible without breaking the factory seal. This aspect of the invention readily enables factory installed components to be despatched in tamper evident sealed containers so that subsequent access to the installed components will be evident on inspecting the condition of the factory seal. This readily enables manufacturers to guarantee the satisfactory performance of factory installed components since malfunction of the components can be readily attributed to faulty manufacture if the seal remains unbroken during a prescribed guarantee period. In this way it is possible for component manufacturers to supply optical component(s) and/or circuits in an enclosure according to this aspect of the invention with a conditional guarantee against component malfunction, that is to say conditional on the tamper evident seal not being broken which may otherwise indicate the installed components have been accessed during installation or maintenance in the field, possibly resulting in damage to the installed components.

In preferred embodiments, the said tamper evident closure member comprises a laminar element sealed to the perimeter of the open end of the said container. The laminar element can physically protect the factory installed components while sealing the open end of the container. The laminar element may provide an intermediate seal between the container and an adjoining organiser tray type closure member which may contain at least one further optical circuit component on the external base surface of the closure member for optically connecting the enclosed components to an external optical circuit. In such embodiments the laminar element provides a flat surface on which the organiser tray can be mounted with respect to the container.

Preferably the laminar element comprises a moisture resistant barrier. This can prevent water and/or moisture ingress into the sealed container. In alternative embodiments the laminar element may not be entirely moisture resistant and in such embodiments the optical components and/or circuit may be enclosed within a moisture resistant sealed envelope with the fibre ends extending outwards of the envelope for connection with further optical components and/or circuits on the other side of the laminar element.

The laminar element may comprise a flexible sheet having a metallised moisture resistant layer. The metallised layer may comprise a layer of aluminium for protecting the optical components against moisture ingress.

Preferably the laminar element is sealed to the periphery of the container by way of the container having a flat rim extending around the outer perimeter of its open end so that the laminar element may be joined to the rim by adhesive, for example a hot melt adhesive, or other means.

BRIEF DESCRIPTION OF THE DRAWINGS

Various embodiments of the invention will now be more particularly described, by way of an example, with reference to the accompanying drawings, in which.

DETAILED DESCRIPTION OF EMBODIMENTS OF THE INVENTION

Figure 1A:
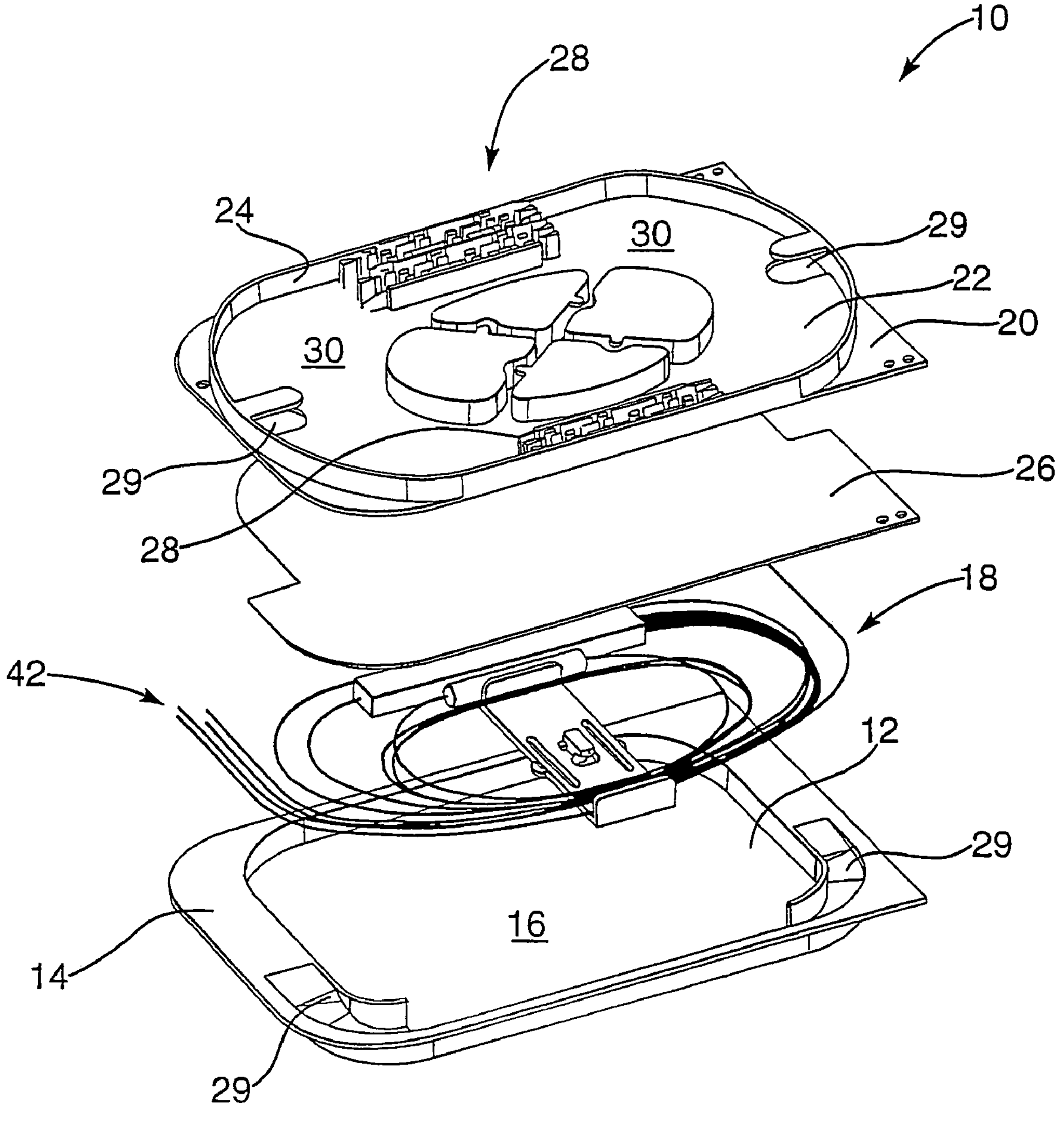
FIG. 1*a* is an exploded perspective view of an optical circuit enclosure according to an arrangement of the invention.

Referring to FIG. 1*a*, an optical circuit enclosure 10 comprises a rectangular shaped open container 12 in the form of a shallow rectangular tray type structure having a flat rim 14 surrounding a hollow interior region 16 of the tray. The size and shape of the hollow region 16 is sufficient to accommodate components of a pre-fabricated or pre-assembled optical circuit 18, for example. Various types of optical circuit may be located in the region 16 of the container and may be mounted with respect to the container by various mounting means, for example by snap-fit connections or adhesive etc. In the embodiment of FIG. 1*a* it is preferred, although not essential, that the optical circuit components 18 are mounted within the region 16 during manufacturing assembly of the enclosure 10.

The enclosure further comprises a closure member 20 which also may be considered to comprise a rectangular tray type structure having a flat rectangular base 22 and upstanding wall sections 24 which form a continuous wall on the external surface (upper surface in the drawing of FIGS. 1*a* and 1*b*) of the closure member. In the context of this description the "external base surface" of the closure member refers to the surface on the opposite side of the closure member 20 from the enclosed container 12. The reverse surface (not shown) on the opposite side of the closure member to the external base surface is flat so that a seal can be formed between the closure member and the rim 14 of the container 12.

The seal is provided by a thin laminar sheet 26 interposed between the container and closure member. The seal can comprise a moisture resistant seal and additionally or alternatively a tamper evident seal closure member closing the open end of the container 12. The laminar sheet 26 preferably comprises an aluminium layer to provide or enhance the moisture resistant properties of the seal. The dimensions of the sheet are approximately the same as the dimensions of the container and closure member so that that a seal is formed continuously around the periphery of the enclosure along the flat rim surface 14 of the container. The laminar sheet 26 may be joined to the rim 14 by adhesive, for example a hot melt adhesive.

A pair of ramp type openings 29 are provided within the rim between the flat surface of the rim 14 and the interior region 16 of the container for accommodating fibre ends 42 of the circuit 18 extending from the interior 16 to the outer surface of the sheet 26.

The container and closure member materials are also moisture resistant and may comprise aluminium, alloys of aluminium or other metals. In other embodiments the container and enclosure member may comprise moisture resistant polymers, for example.

The external base surface of the closure member is provided with various features for mounting or holding further optical circuit components, for instance splitters, couplers, filters, attenuators, and/or other active and passive optical components and free or uncut lengths of optic fibre or fibre ends. In this respect the enclosure of the present invention contemplates that delicate, sensitive and/or expensive optical components will be installed as prefabricated circuits or otherwise in the enclosed region 16 so that they are fully protected from environmental damage and/or damage caused during installation of the optical circuit in an external circuit or network, while more robust components are mounted on the external base surface of the enclosure member so that the closure member constitutes a conventional organiser tray.

In the arrangement of FIG. 1*a*, the external base surface of the closure member 20 includes a pair of upstanding mounting elements 28 for mounting optic fibre splice holders (not shown) and open regions 30 for storing spare lengths of fibre. A pair of apertures 29 are provided at opposite ends in the base 22 of the closure member to accommodate the fibre ends 42 passing through the openings 29 into the interior regions 30.

The enclosed components 18 are connected to fibres which pass through the seal for connecting these components to other components as desired. It is preferred that the fibre ends are sealed between the sheet 26 and the rim 26 by adhesive. Alternatively or additionally the fibre ends can be accommodated between two sealing strips (not shown) so that they are not in direct contact with either the container 12 or closure 20 when they pass through the seal 26. By providing a pair of sealing members in the region of the seal 26 for sealing the fibres, the strips can be sealed around the fibres by the application of heat and/or pressure. This sealing of the fibres may be achieved by the optical fibre sealing method described in GB patent application no. 0110366.2 which will be discussed in more detail below.

Figure 1B:
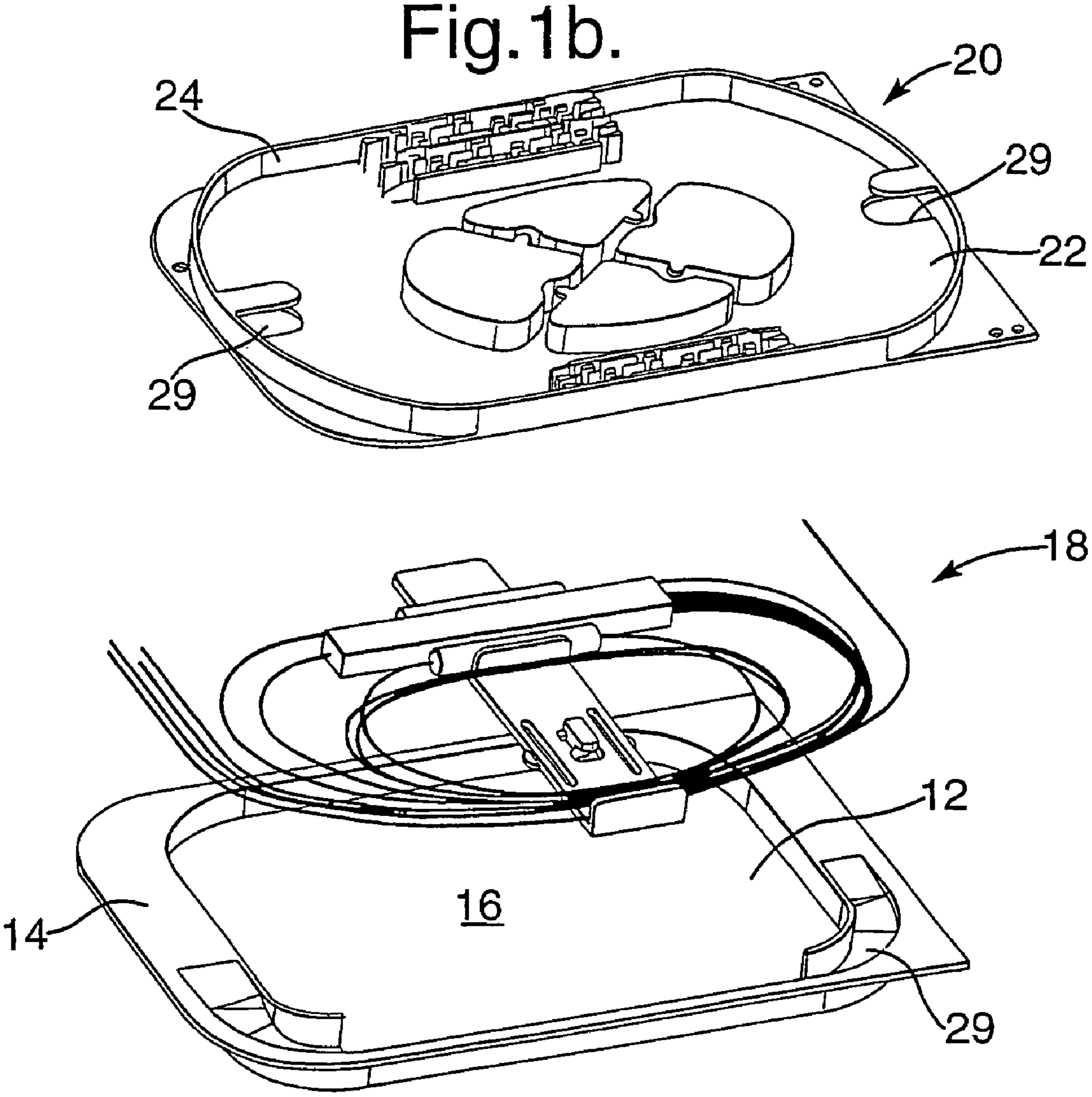
FIG. 1*b* is a perspective view similar to that of FIG. 1 of an optical circuit enclosure according to a second arrangement of the invention.

In the alternative arrangement of FIG. 1*b* the sheet 26 has been removed so that the container is closed directly by the closure member 20. In this arrangement a tamper evident seal may be provided around the adjoining rims of the container 12 and closure 20. The base 22 engaging the rim 14 may constitute a moisture resistant seal between the enclosed region 16 and the other side of the closure member.

In another embodiment (not shown) the invention also contemplates arrangements in which the container is closed by the sheet 26 which constitutes a factory installed tamper evident closure member and/or seal. The enclosed container may be subsequently attached to an organiser tray type closure such as that of closure 20 in FIGS. 1*a* and 1*b* when installed in an external optical circuit. In this arrangement the tamper evident seal protects the optical components during storage, transport and/or installation and may additionally, although not necessarily, provide a moisture resistant seal or barrier for the installed components.

Figure 2:
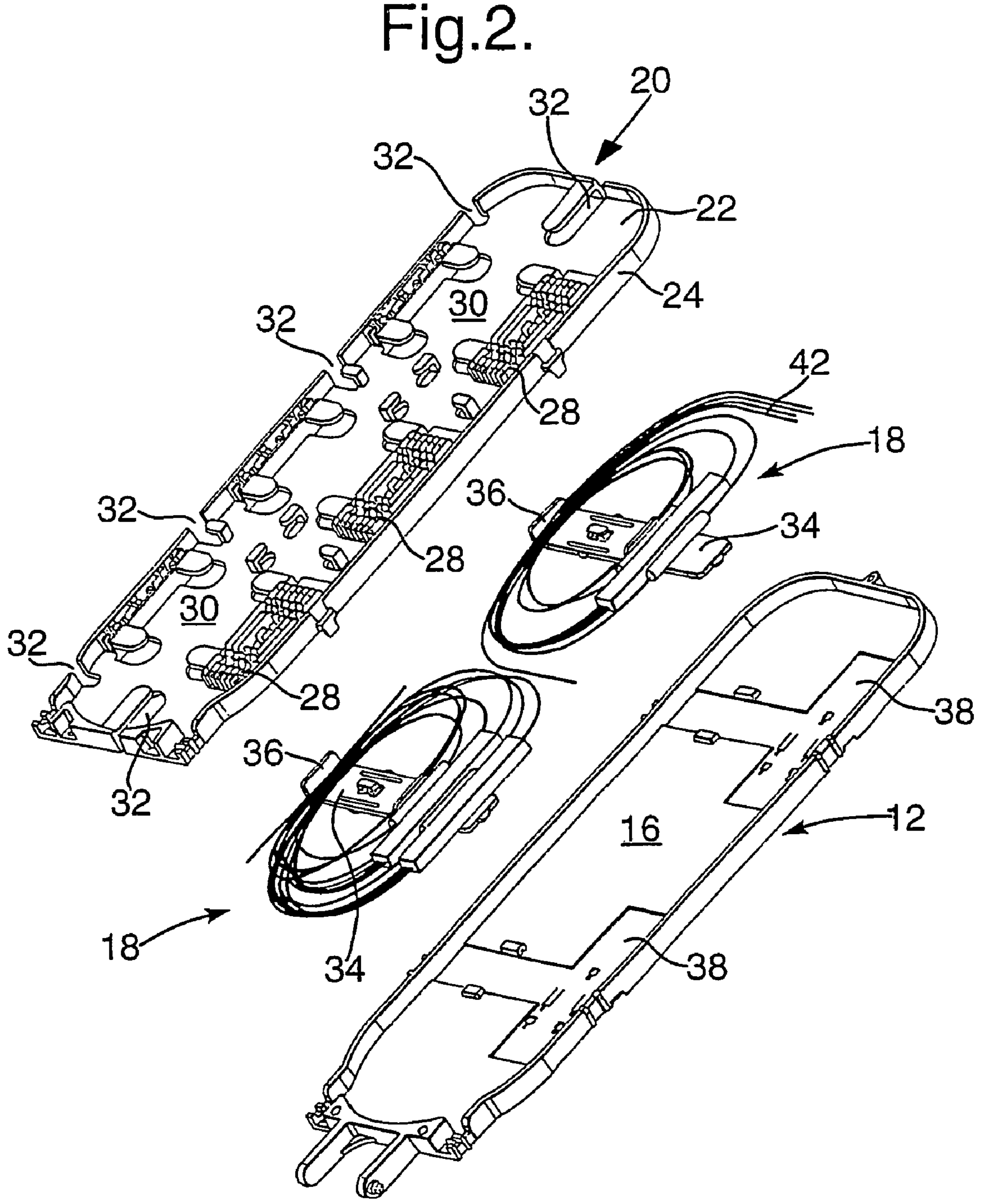
FIG. 2 is an exploded perspective view similar to that of FIG. 1*a*, but with an optical circuit enclosure according to a further arrangement of the invention.

Referring now to FIG. 2, in a second arrangement the enclosure 10 comprises a container 12 and an enclosure member 20 of slightly different proportions to that of FIGS. 1*a* and 1*b*. In this arrangement the laminar sheet 26 has been removed and the base portion 22 of the closure member comprises a series of apertures 32 so that the enclosed region 16 on the underside of the closure member 20 is not sealed with respect to the upper or external side thereof. In the arrangement shown the enclosure is sufficiently long to accommodate two prefabricated optical circuits 18 in a side-by-side arrangement within the container. The optical circuits 18 are similar although not identical to each other but are prefabricated for factory installation within the container 12 in the same way as the circuit 18 of FIG. 1.

The optical circuits 18 are prefabricated in accordance with the method described in GB patent application no. 0129906.4. This method of assembling a fibre optic circuit comprises the steps of providing fibre optic components connected to optical fibres having fibre ends, arranging the fibre optic components on a support 34, routing the fibre ends in accordance with a predetermined circuit configuration, and splicing and/or connecting the fibre ends so as to complete the circuit. In this method a plurality of fibre ends 42 are spliced simultaneously and supported in a splice holder 36.

These prefabricated pre-assembled optical circuits 18 are mounted within correspondingly shaped recesses 38 provided in the internal surface of the container 12. The support members 34 may be connected to the container surface by adhesive, snap-fit connections or other mounting means during factory installation of the circuits during manufacturing assembly. One or both of the circuits 18 shown in the embodiment of FIG. 2 may be replaced with the hermetically sealed circuit shown in FIG. 3.

Figure 3:
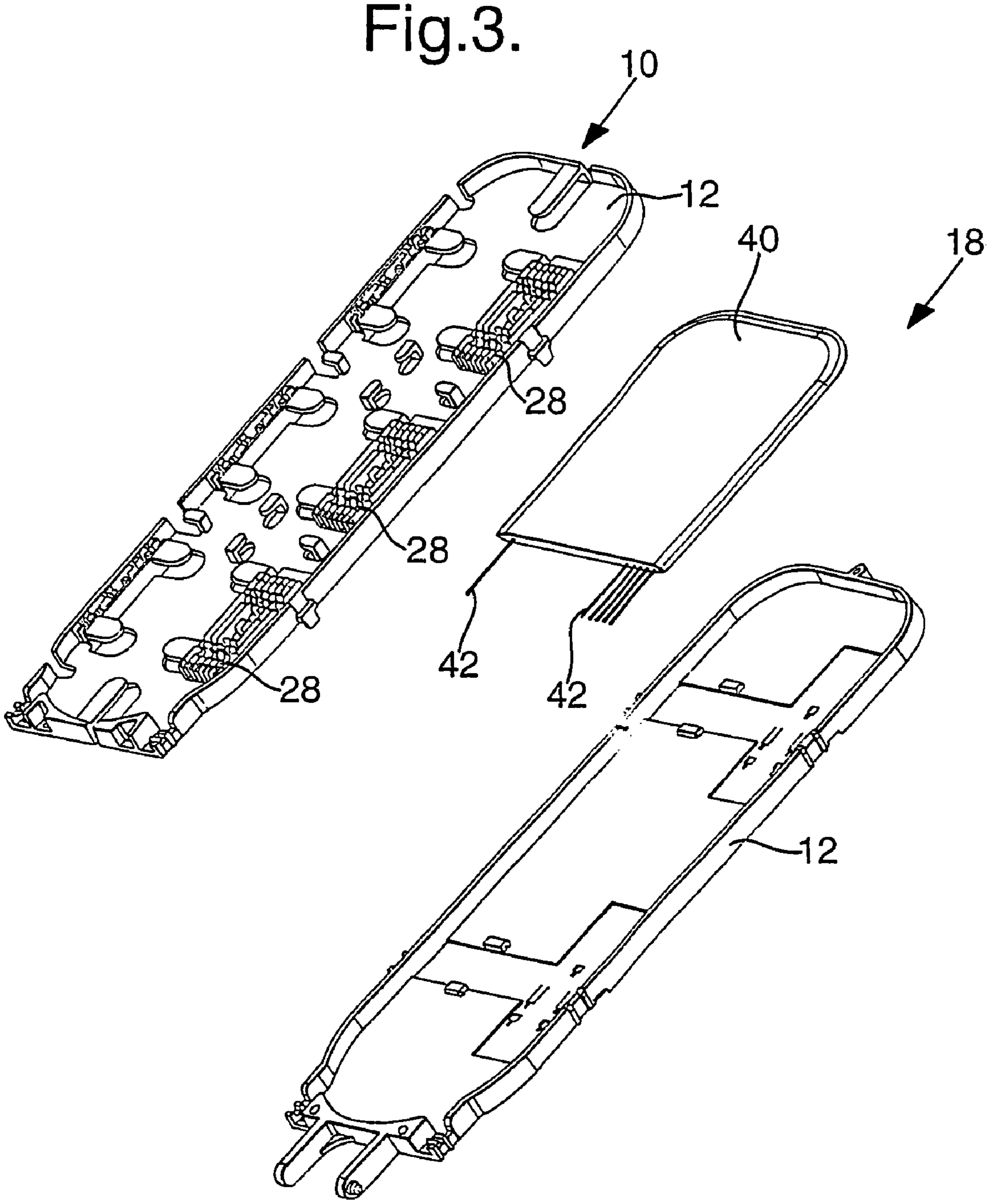
FIG. 3 is an exploded perspective view of the enclosure of FIG. 2 with a different type of prefabricated circuit to be enclosed to that shown in FIG. 2.

Referring to FIG. 3, the enclosure 10 is identical to that shown in FIG. 2 but in this drawing the optical circuit or components 18 are hermetically sealed within a moisture resistant envelope 40 before being mounted in the internal region 16 of the container. In this arrangement the electronic components or circuit 18 are hermetically sealed such that the fibre ends 42 connected to the components being sealed extend outwards of the seal for connection to other components. This method of sealing optical components may be as is described in GB patent application 0110366.2 which describes a method of sealing the enclosing space into which at least one optical fibre is fed. This method comprises the steps of: providing a container having an opening, providing two sealing strips, accommodating a portion of at least one optical fibre between the two sealing strips, applying heat and/or pressure to the strips to as to produce a sealing member which sealing encloses the at least one fibre, placing the sealing member in the opening and applying heat and/or pressure to the container so as to seal the opening on to the strips. In this method it is preferred that the container is constituted by a bag made of a laminate comprising aluminium and that the sealing strips are made of plastic and are provided with a layer of hot melt adhesive.

In the arrangements of FIGS. 2 and 3 the fibres ends 42 may be connected to components on the external base surface of the closure 20 by passing through one or more of the apertures 32 formed in the base portion 22 of the closure. This provides the advantage that delicate, sensitive and/or expensive optical components or circuits may be enclosed in the region 16 during manufacturing assembly and thereby protected by the closure 20 from damage during installation of the circuit or components to an external circuit or network. This provides for additional automation of the manufacturing assembly process since only those components that access is required to need to be mounted on the external base surface of the closure or tray organiser 20.

Figure 4:
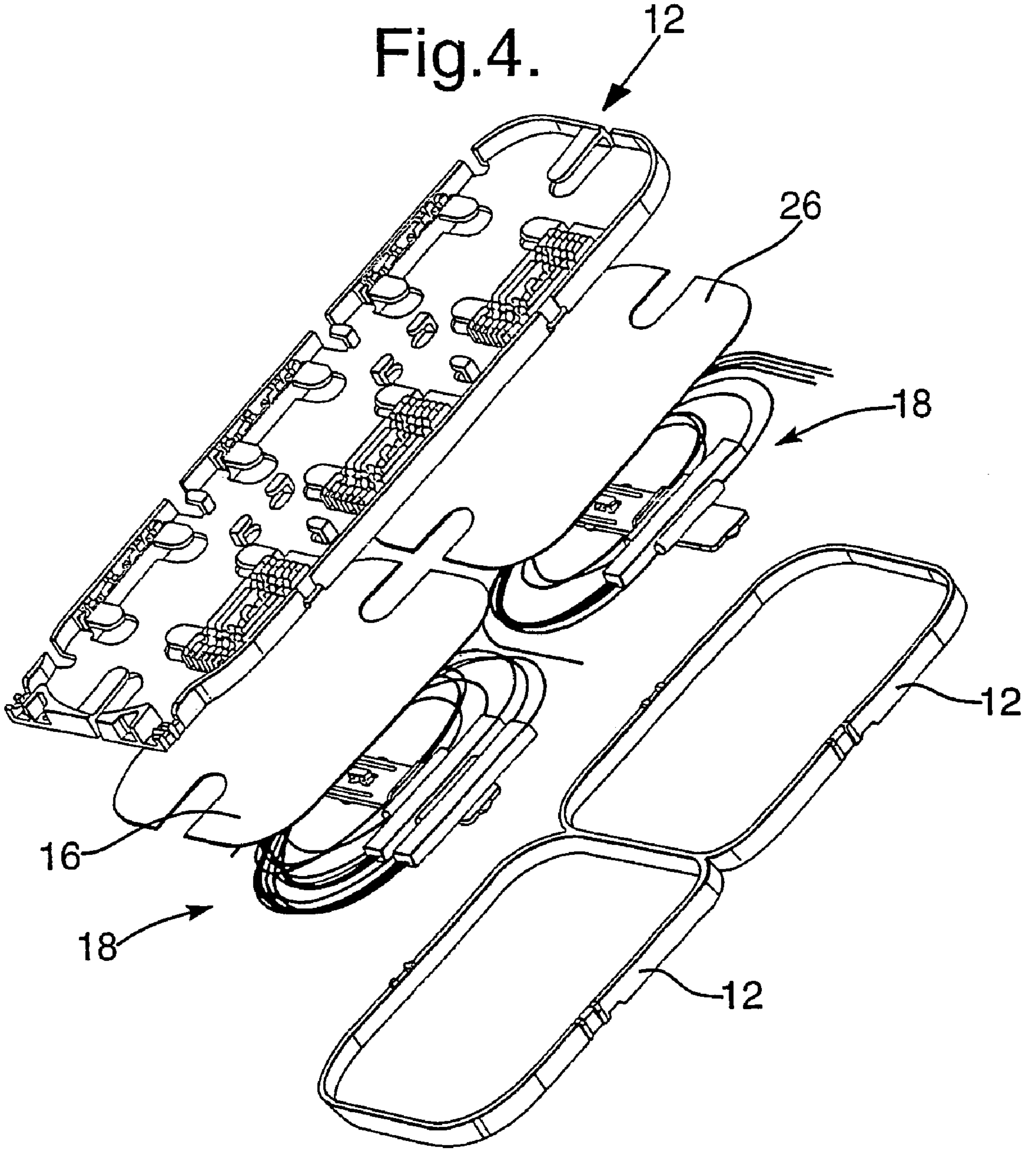
FIG. 4 is an exploded perspective view of an enclosure similar to that of FIG. 2 with separate open containers for containing separate optical circuits or components.

In the arrangement of FIG. 4, a pair of optical circuits 18 are arranged in side by side relation as in the arrangement of FIG. 2. In FIG. 4, however, the circuits are enclosed in separate containers 12 and covered by separate tamper evident sheets 26. In this arrangement the enclosed containers 12 are each independently mounted on the underside of the organiser tray closure member 20. This arrangement readily enables the same or different components and/or circuits to be mounted independently of each other with respect to the closure member 20. In the arrangement one or both the optical circuits 18 may be replaced by a hermetically sealed optical circuit of the type shown in FIG. 3.

Figure 5:
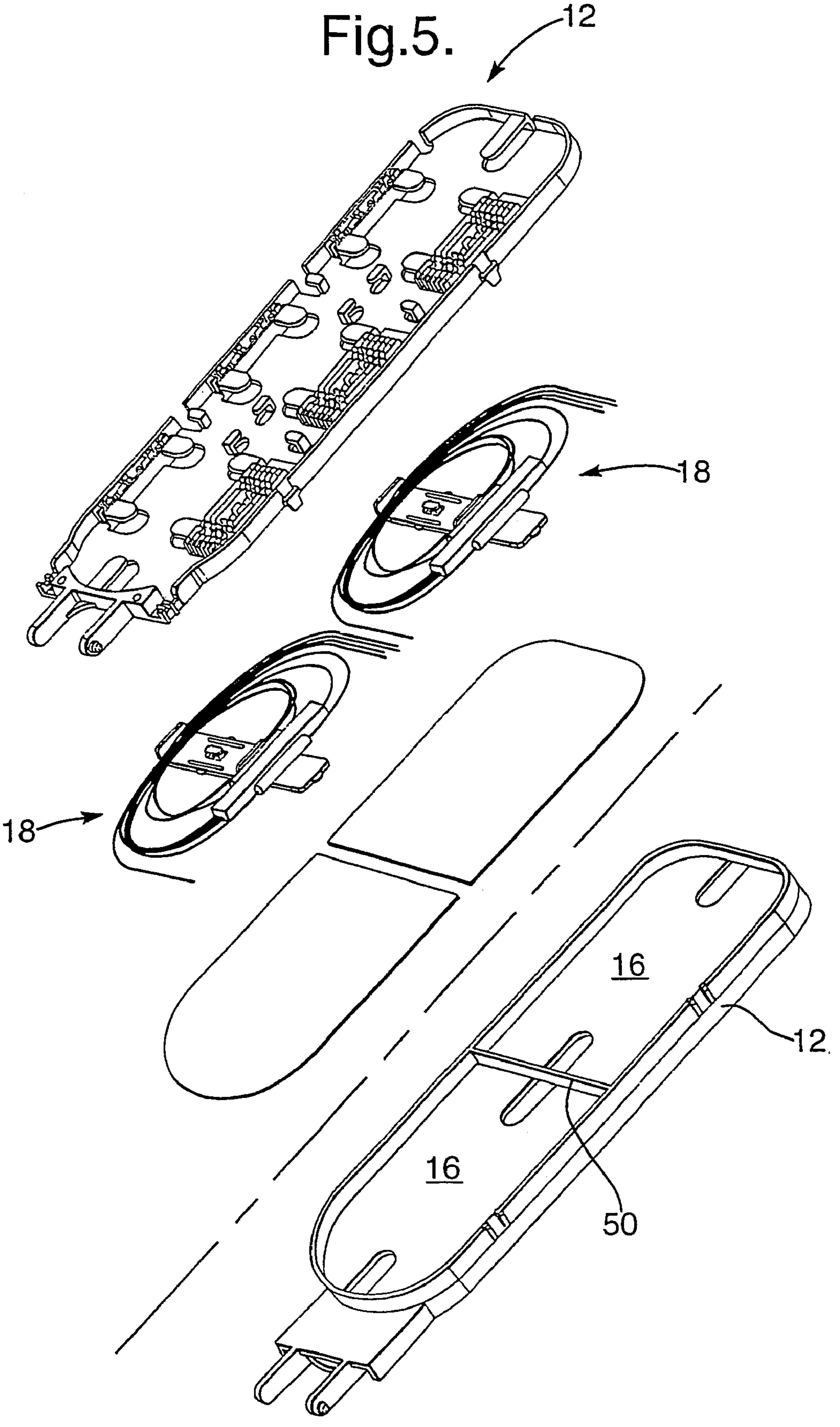
FIG. 5 is an exploded perspective view of an enclosure similar to FIG. 2 with an open container having two separate compartments for enclosing separate optical circuits or components.
Figure 6:
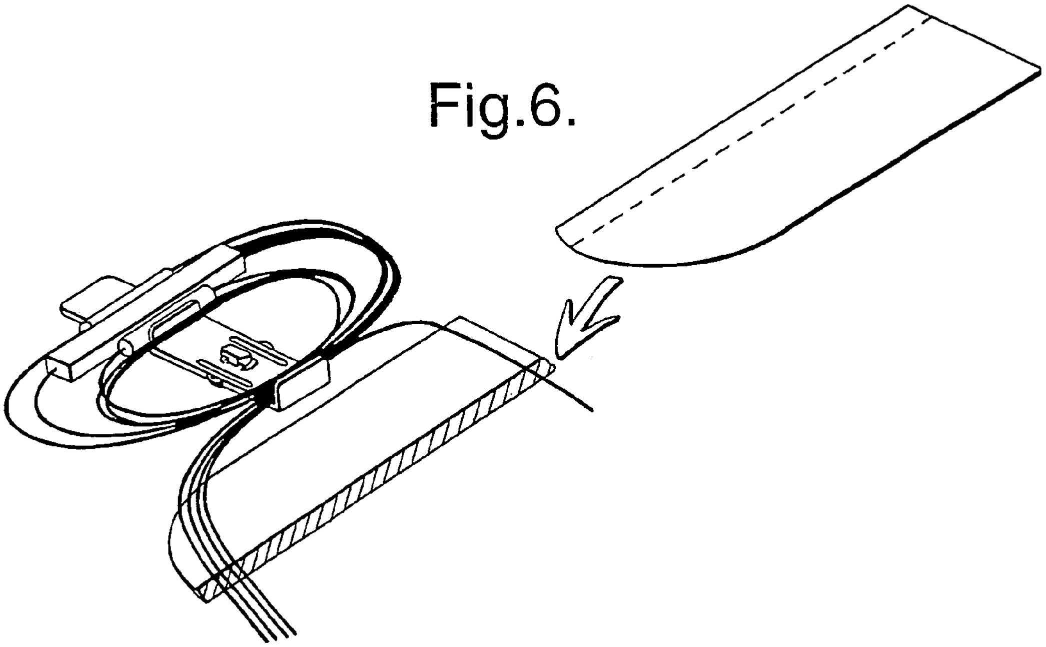
FIG. 6 shows optical circuitry with optical fibres leading to and from the same being laid between opposed portions of a flexible, metallised tamper-evident closure sheet.
Figure 7:
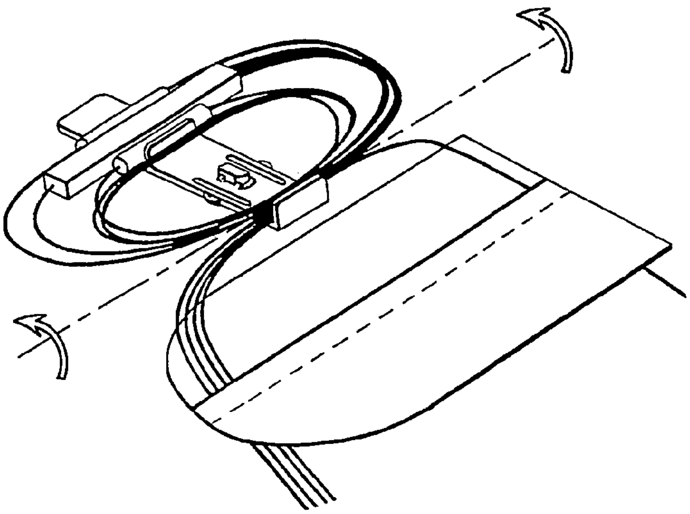
FIG. 7 shows the two portions of the closure sheet sealed around the fibres.
Figure 8:
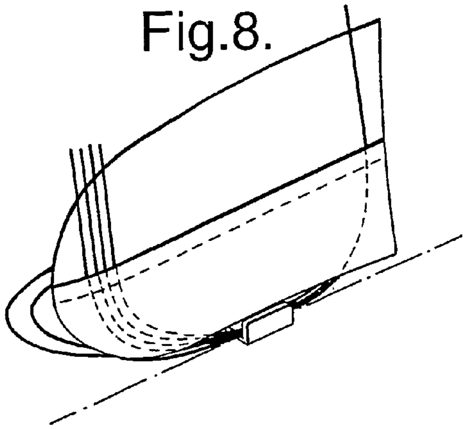
FIG. 8 shows the assembly after rotation of the closure sheet in the sense indicated by the arrows in FIG. 2.
Figure 9:
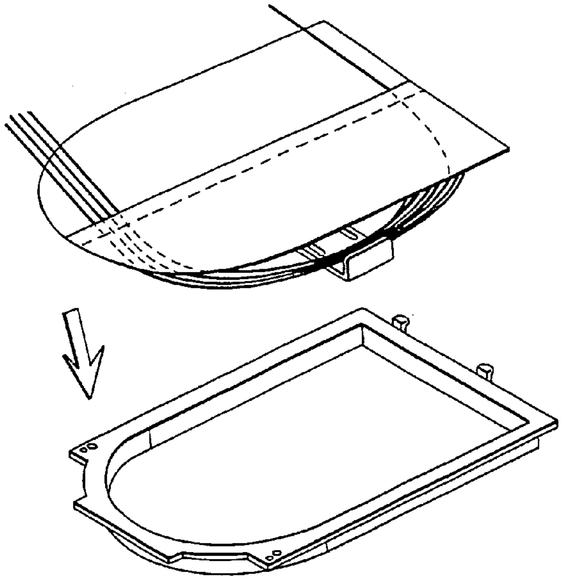
FIG. 9 shows the assembly of FIG. 3 being brought towards the tray-type container.
Figure 10:
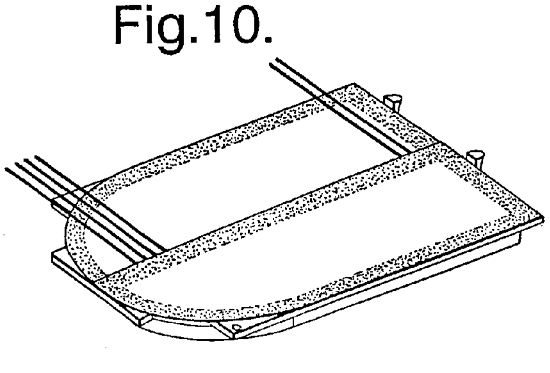
FIG. 10 shows the enclosure resulting from FIG. 4.
Figure 11:
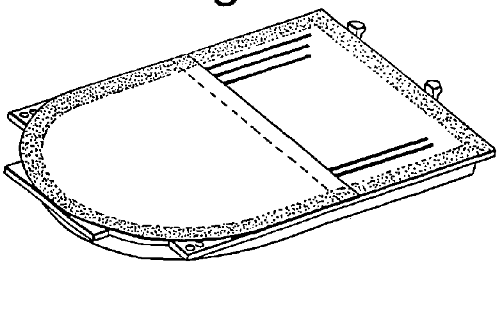
FIG. 11 shows an alternative position of the fibre entry and exit seals achieved simply by altering the shape and arrangement of the closure sheet.
Figure 12:
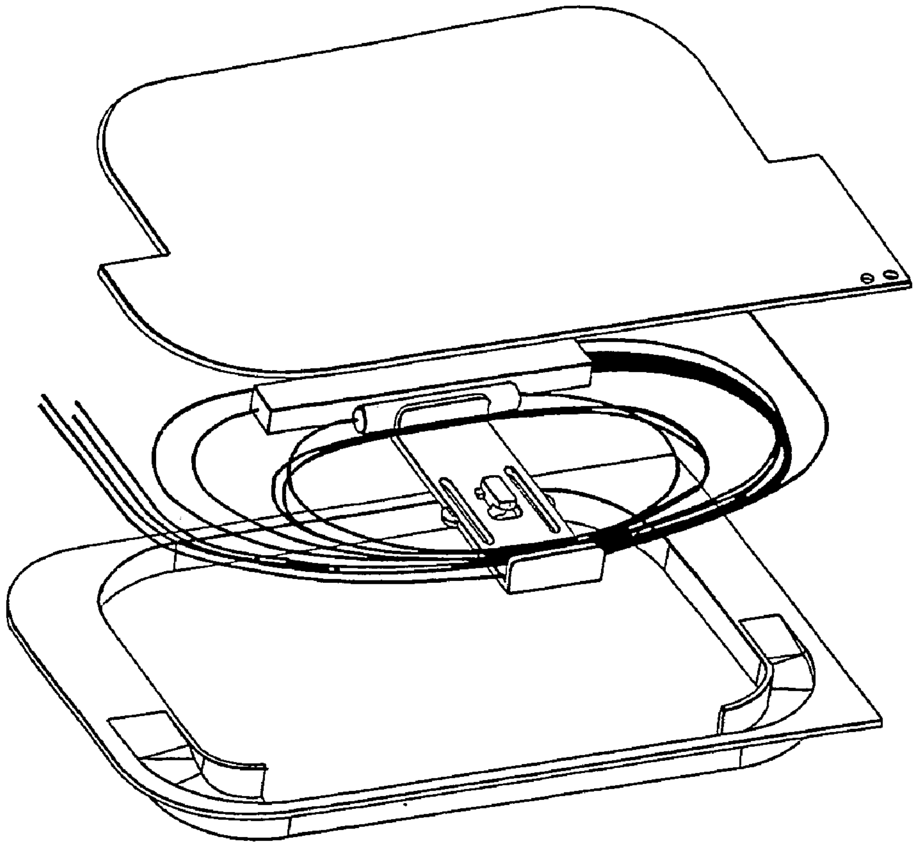
FIGS. 12 and 13 show the aforementioned less favourable arrangement, not according to the present invention, wherein the fibres are sealed between the closure sheet and the container surface.
Figure 13:
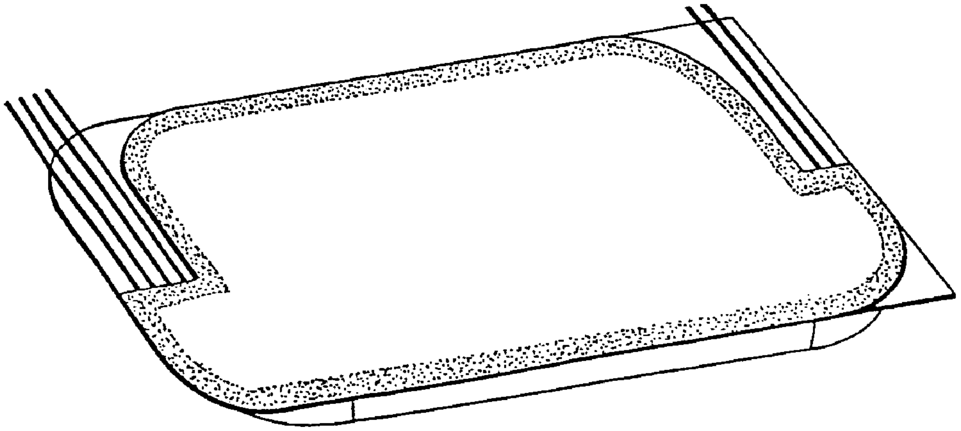

In the embodiment of FIG. 5 the container 12 is provided with an upstanding dividing wall 50 for dividing the interior region 16 into two separate compartments so that each component encloses a separate optical circuit 18 in side by side relation. The optical circuits may be the same type or different, for example as shown in FIG. 2 or 3.

The present invention includes a variant wherein optical fibres entering and/or leaving the enclosure are sealed between opposed portions of the tamper-evident closure member, instead of between the tamper-evident closure member and the container tray. This variant according to the present invention has the advantages that the location of the sealed fibre entry and exit points can readily be altered in the installation factory to suit particular user requirements, without re-designing the container; that the entry/exit points can be located above the container and wholly within its periphery, thus reducing the overall spread of the enclosure; and that the closure member can be more reliably sealed to the container surface in the absence of intervening optical fibres.

This variant of the invention can readily be understood from these drawings without further explanation. This variant can be combined with any appropriate embodiments or features hereinbefore described.

Although the invention has been described with reference to embodiments shown in the accompanying drawings it is to be understood that the invention is not so limited to those precise embodiments and that various changes and modifications may be effected without further inventive skill and effort. For example, the seal between the container and closure member in the arrangement of FIG. 1*a* may be replaced by a gasket or o-ring type seal or other sealing means if required.

The Invention claimed is:

1. An optical circuit enclosure enclosing at least one optical circuit or optical circuit component; the said enclosure comprising:

a tray-type container containing at least one circuit or components, a tray-type closure member having a base with an external surface and arranged with the external surface covering the container, the closure member carrying on the opposite side thereof from the container at least one further optical circuit component for connecting the enclosed circuit or component to an external circuit or component, and sealing means providing a moisture-resistant seal between the container and the closure member;

wherein the sealing means provides a moisture resistant seal between the container, the closure member and fibre optic connecting cables exiting an enclosed region of the container from the enclosed circuit or component; and wherein the sealing means comprises a pair of sealing strip members and the optical fibres are located between the sealing strip members and sealed to the sealing strip members by the application of heat and/or pressure.

2. An optical circuit enclosure as claimed in claim 1 wherein the closure member is attachably/detachably mounted with respect to the container.

3. An optical circuit enclosure as claimed in claim 1 wherein the enclosed circuit or component is a pre-installed and/or pre-fabricated circuit or component installed in the container during manufacturing assembly thereof.

4. An optical circuit enclosure as claimed in claim 1 wherein the at least one further optical circuit or component comprises an optical splitter, coupler, attenuator filter, or other passive and/or active optical component(s) and/or fibre optic cable.

5. An optical circuit enclosure as claimed in claim 1 comprising at least one further container and wherein the closure member closes each of the containers, thereby to provide separate enclosures for respective optical circuits and/or components.

6. An optical circuit enclosure enclosing at least one optical circuit or optical circuit component together with lengths of optical fibre which extend outwards of the enclosure for optically connecting the enclosed circuit(s) or component(s) to an external circuit or component, the enclosure comprising:

a tray-type container containing the at least one enclosed or circuit or component, and further containing the lengths of optical fibre; and a tamper-evident closure member sealing the container around the enclosed circuit or component and the enclosed lengths of optical fibre.

7. An enclosure as claimed in claim 6 wherein the tamper evident closure member comprises a laminar element sealed to an open end of the container.

8. An enclosure as claimed in claim 7 wherein the laminar element comprises a moisture resistant barrier.

9. An enclosure as claimed in claim 8 wherein the barrier element comprises a flexible sheet having a metallised moisture resistant layer.

10. An enclosure as claimed in claim 6 wherein the tamper-evident closure member comprises a laminar element sealed to a periphery of the container.

11. An enclosure according to claim 6, wherein the enclosed optical circuit or component is at least partly enclosed in a sealed bag-like article which is itself wholly enclosed within the container.

12. An optical circuit enclosure enclosing at least one optical circuit or optical circuit component together with lengths of optical fibre which extend outwards of the enclosure for optically connecting the enclosed or circuit or component to an external circuit or component, the enclosure comprising:

a tray-type container containing the at least one enclosed circuit or component, and further containing the lengths of optical fibre;

and a tamper-evident closure member sealing the said container around the enclosed circuit or component and the enclosed lengths of optical fibre, wherein optical fibres entering and/or leaving the enclosure are sealed between opposed portions of the tamper-evident closure member.

13. An optical circuit enclosure as claimed in claim 1 wherein the external surface closes the container.

* * * * *